United States Patent [19]

Yabe et al.

[11] Patent Number: 4,633,414
[45] Date of Patent: Dec. 30, 1986

[54] ROBOT OPERATION CONTROL SYSTEM

[75] Inventors: Yuhiko Yabe, Kasukabe; Hideo Uzuhashi; Yoshiaki Yoshikawa, both of Tochigi, all of Japan

[73] Assignee: Hitachi, Ltd., Tokyo, Japan

[21] Appl. No.: 555,616

[22] Filed: Nov. 28, 1983

[30] Foreign Application Priority Data

Nov. 26, 1982 [JP] Japan .................................. 57-206186
Mar. 14, 1983 [JP] Japan .................................. 58-40688

[51] Int. Cl.$^4$ ........................ G05B 19/42; B25J 9/00; B25J 13/00
[52] U.S. Cl. .................................. 364/513; 364/133; 318/568; 901/2; 901/9
[58] Field of Search .............................. 364/131–136, 364/513; 318/568; 901/2–5, 9

[56] References Cited

U.S. PATENT DOCUMENTS

| | | | |
|---|---|---|---|
| 3,668,498 | 6/1972 | Austin et al. | 364/513 |
| 3,689,892 | 9/1972 | Glenn et al. | 364/513 |
| 4,115,684 | 9/1978 | Lindbom | 318/568 |
| 4,130,873 | 12/1978 | Fioretta et al. | 901/4 |
| 4,308,584 | 12/1981 | Arai | 364/513 |
| 4,467,436 | 8/1984 | Chance et al. | 364/133 |
| 4,488,242 | 12/1984 | Tabata et al. | 364/165 |

OTHER PUBLICATIONS

A Microprocessor Control System for an Industrial Robot; International Electrical, Electronics Conference and Exposition; Toronto, Canada, 5–7 Oct. 1981; pp. 118–119.

Primary Examiner—Jerry Smith
Assistant Examiner—Allen MacDonald
Attorney, Agent, or Firm—Antonelli, Terry & Wands

[57] ABSTRACT

A robot operation control system for point-to-point movement is disclosed in which each motor is provided with a microcomputer and a predetermined acceleration/deceleration control is effected for each microcomputer, so that specified given points may be passed smoothly in a given sequence.

4 Claims, 4 Drawing Figures

ROBOT OPERATION CONTROL SYSTEM

The present invention relates to a robot control system for point-to-point movement, or more in particular to a robot control system wherein given points specified in advance are passed in a predetermined sequence by distributed control with low-function microcomputers.

In conventional robots controlled point-to-point, each joint angle of the robot is subjected to a closed loop control between a control system and a drive system to compute the next predicted angle each time of sampling. This type of control requires the computation of a multiplicity of predicted angles for acceleration or deceleration following an acceleration/deceleration curve set according to a very short sampling time, resulting in a disadvantage that a high-speed high-performance microprocessor is required as a control unit with a complicated control software and large-scale circuit configuration. Further, a servo motor is used as an arm-driving actuator so that it is necessary to attain the high-speed rotation of the motor by use of a pulse generator of high resolution or a reduction gear of high reduction ratio in order to improve the positioning accuracy.

The object of the present invention is to provide a robot operation control system wherein a robot subjected to point-to-point control is adapted to pass prescribed given points in a predetermined sequence by distributed control of low-function microcomputers without the need of complicated computations.

In order to achieve this object, according to the present invention, there is provided a robot operation control system wherein each joint angle of the robot is subjected to an open loop control between a control system and a drive system with acceleration/deceleration being controlled by an independent acceleration/deceleration control section for each joint drive section, so that the control section subtracts a numeral proportional to the absolute angle of the present position from a numeral proportional to the absolute angle of a target point (the number of pulses from the origin) and transmits a positive or negative sign (representing right or left turn) of the difference to the acceleration/deceleration control section thereby to control the robot operation.

The present invention will be apparent from the following detailed description taken in conjunction with the accompanying drawings, in which.

Figure 1:
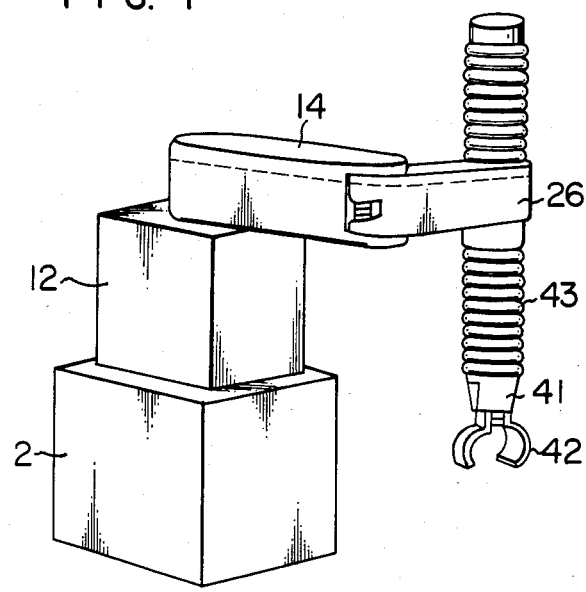
FIG. 1 is a diagram showing the appearance of a robot of SCARA (Selective Compliance Assembling Robot Arm) type using a control system according to the present invention.

The present invention will be explained below with reference to an embodiment shown in FIGS. 1 to 4. First, the construction and mechanism of the present system will be described with reference to FIGS. 1 and 2. An iron base 1 of a control section has arranged thereon a metal cabinet 2 for the control section. The cabinet 2 has a metal partition plate 5 for dividing the internal space thereof into a control chamber 3 and a power chamber 4. The control chamber 3 is hermetically sealed by the base 1, the cabinet 2 and the partition plate 5. A substrate 8 with microcomputers is arranged within the control chamber 3. The power chamber 4 of the cabinet 2 has a vent 2a, and the power chamber 4 contains a power section 10 such as a transformer and a fan 11. The fan 11, which is for cooling the power section 10 forcibly, cools the metal partition plate 5 at the same time, and therefore the control chamber 3 may be cooled sufficiently even if it is hermetically sealed. By hermetically sealing the control chamber 3 this way, it is possible to shut off dust and dirt thereby to improve the reliability of the microcomputers 6 in the control chamber 3.

The control section cabinet 2 has secured thereon a cabinet 12 of iron plates to form a first drive chamber 13. A first arm 14 is horizontally rotatably mounted on the cabinet 12. The first drive chamber 13 contains therein a first drive unit 15 for driving the first arm 14. This first drive unit 15 includes a first drive motor 16, a first lower belt 17, a first transmission device 18 and a first upper belt 19. The first drive motor 16 is of stepping type and secured on the cabinet 12 through a support plate 20 in such a manner that a rotary shaft 16a thereof projects upward. Numeral 60 designates a first rotary type pulse generator connected to the rotary shaft of the first drive motor 16. The first transmission device 18 includes a central rotary shaft 18a rotatably supported on upper and lower bearings 21a, 21b of a large channel-shaped support 21, a first lower disc 18b secured to the lower side thereof, and a small first upper disc 18c secured to the upper side thereof. The first lower belt 17 is extended over the first drive motor rotary shaft 16a and the first lower disc 18b. The first upper belt 19, on the other hand, extends over the first upper disc 18c and the first arm rotary shaft disc 22a. The first arm 14 includes a first lower arm 14a and a first upper arm 14b. The first lower arm 14a and the first upper arm 14b are made in light weight by plastic injection molding, thereby greatly contributing to a reduced capacity of the first drive motor 16. Also, since the first lower arm 14a and the first upper arm 14b have a section substantially channel shaped, the strength thereof is high on the one hand and the internal components thereof are easily reparable by removing the first upper arm 14b on the other hand. A rotary shaft 22 is secured to the lower side of an end of the first arm 14. This rotary shaft 22 is projected into the cabinet 12 and is rotatably supported on an upper bearing 23 on the cabinet 12 and a lower bearing 24 in the cabinet 12. The lower bearing 24 is secured on the cabinet 12 through a support 25. A large disc 22a is secured at the central portion of the first arm rotary shaft 22. When the first drive motor 16 is driven, the turning effort of the rotary shaft thereof is transmitted to the transmission device 18 via the first lower belt 17, and further to the rotary shaft 22 via the first upper belt 19, so that the first arm 14 is rotated by being decelerated behind the first drive motor 16. The first drive motor 16 is arranged directly under the first arm rotary shaft 22 and compactly accomodated within the cabinet 12. The first arm 14 contains therein a second drive unit 27 for driving the second arm 26. The second drive unit 27 includes a second drive motor 28, a second lower belt 29, a second transmission device 30 and a second upper belt 31. The second drive motor 28 is of stepping type arranged above the first lower arm 14a through a support 32. Numeral 61 designates a second rotary-type pulse generator connected to the rotary shaft of the second drive motor 28. The rotary shaft 28a of the second drive motor 28 is projected downward. The second transmission device 30 includes a shaft 30a fixed on the first lower arm 14a and a first lower disc 30b and a second upper disc 30c rotatably supported on the shaft 30a. The second lower disc 30b is larger in diameter than the second upper disc 30c. The second lower belt 29 is extended over the second drive motor rotary shaft 28a and the second lower disc 30b. The first upper belt 31 is extended over the second upper disc 30c and a second rotary shaft disc 33a. A second arm 26 is comprised of a second lower arm 26a and a second upper arm 26b. The second lower arm 26a and the second upper arm 26b are made in light weight by plastic injection molding, thus being useful in reducing the capacity of the second drive motor 28. Further, the fact that the second lower arm 26a and the second upper arm 26b form a substantially channel-shaped section leads to a high strength on the one hand and to the facility with which the internal components thereof is reparable by removing the second upper arm 26b on the other hand. The second arm 26 has an end thereof inserted into an opening 14d of the other end of the first arm 14. The same end of the second arm 26 has mounted thereon a rotary shaft 33 vertically extending through the arms 14 and 26, which rotary shaft 33 is supported on the upper and lower bearings 14e and 14f of the first arm and has a large-diameter disc 33a at the central portion thereof. Upon energization of the second drive motor 28, the turning effort of the rotary shaft 28a is transmitted to the second transmission device 30 through the second lower belt 29, and further to the rotary shaft 33 through the second upper belt 31, whereby the second arm 26 is rotated at a lower speed than the second drive motor 28. In view of the fact that the turning effort of the second drive motor 28 is transmitted through the second transmission device 30 to the second arm 26, the size of the disc 33a of the second arm rotary shaft 33 may be reduced so that the outer diameters of both the first arm 14 and the second arm 26 may be reduced.

The second arm 26 has arranged therein a third drive unit 35 for driving the third vertically movable shaft 34. The third drive unit 35 includes a third drive motor 36 and a third gear 37. The third drive motor 36, which is made up of a stepping motor, is secured on a rib 26c of the second lower arm 26a. Numeral 62 designates a third rotary type pulse generator connected to the rotary shaft of the third drive motor 36. The rotary shaft 36a of the third drive motor 36 is projected laterally. The third gear 37 has the ends thereof supported rotatably on an end of the second lower arm 26a and the rib 26e, and is adapted to engage the recesses and protrusions of the third vertically movable shaft 34. The third gear 37 is coupled to the third drive motor 36.

The third vertically movable shaft 34 extends through the second arm 26 and is supported vertically movably by supports 39 and 40. The third vertically movable shaft 34 is covered with a bellows member 43. A fourth drive motor 41 is secured on the lower end of the third vertically movable shaft 34 and has a rotary shaft 41a thereof projected downward. This rotary shaft 41 is mounted with a gripper 42 or the like to relocate a machine part or other object to be handled.

Figure 3:
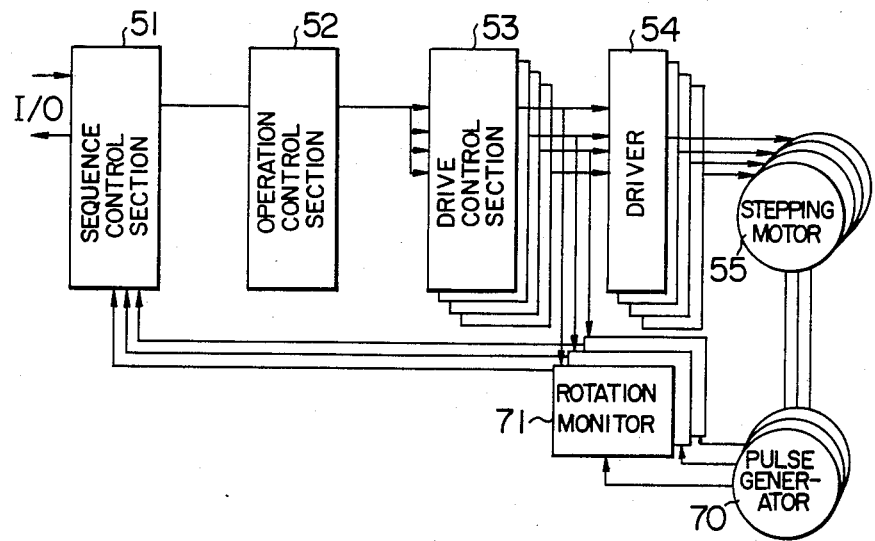
FIG. 3 is a diagram showing a schematic construction of an operation control system according to the present invention.

Now, the control section will be described with reference to FIG. 3. A sequence control section 51 is for indicating the next target point on the basis of a point instructed through the I/O interface in accordance with a prescribed sequence. An operation control section 52 stores therein the absolute number of pulses associated with each axis of the target point indicated by the sequence control section 51 and further has stored therein the absolute number of pulses associated with each axis of the present point. In the case where the arm is to be relocated to a target point specified by the sequence control section 51, the difference of the absolute numbers of pulses between the target point and the present point is computed and produced. Subsequently, the number of pulses for the target point is rendered to coincide with that for the present point. The number of pulses sent from the operation control section 52 are applied to the drive control sections 53 independently associated with each axis of the arm. Each of the drive control sections 53 produces an output for effecting acceleration/deceleration control along a predetermined curve in accordance with the number of pulses sent from the operation control section 52. The output from the drive control section 53 is converted at an excitation driver 54 into sufficient power to rotate the motor. Numeral 55 designates an actuator such as a stepping motor for rotating each shaft by a specified angle. A rotary-type pulse generator 70 (corresponding to the pulse generators 60, 61 and 62) connected to the output shaft of the actuator is normally to generate a multi-phase pulse so that pulses determined by the rotational angle and rotational direction of the shaft of the actuator 55 are applied to a rotation monitor 71.

Figure 4:
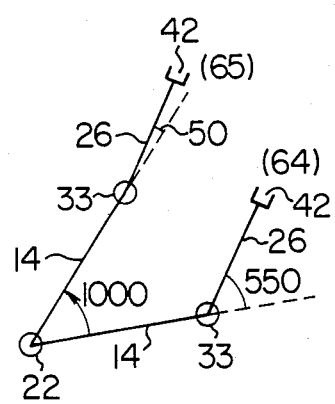
FIG. 4 is a diagram for explaining the operation of a control system according to the present invention with one or two shafts of a robot of SCARA type.

In the operation control unit according to this embodiment, the robot is instructed of the position of operation in such a way that by moving the arm directly by hand, the actuator is rotated. As a result, a pulse generator connected to the actuator generates pulses determined by the direction and rotational angle involved. By detecting these pulses at the rotation monitor 71, it is possible to automatically determine the amount of pulses corresponding to the specified position. In this manner, the robot may be instructed directly manually. When the hand of the robot is to move from point 64 to point 65, as shown in FIG. 4, the sequence control section 51 applies a signal of point 65 to the operation control section 52 on the basis of sequence storaged in a memory. The operation control section 52 reads the absolute number of pulses for each axis at the present point 64 and the target point 65 from the memory, computes by subtraction the direction and the number of pulses to be rotated for each axis, and applies the result thereof to the drive control section 53 for each shaft.

Figure 2:
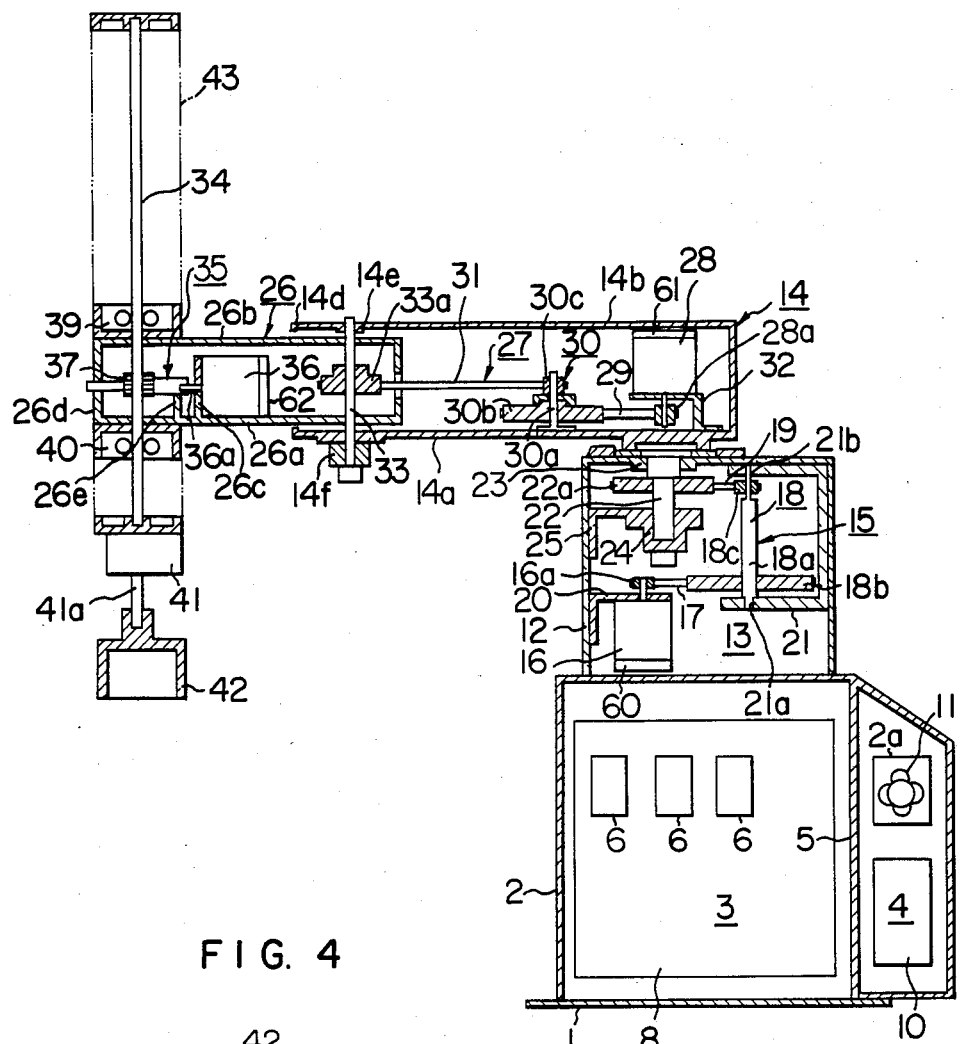
FIG. 2 is a longitudinal sectional view of the same robot.

FIG. 4 is a diagram for explaining the operation of this invention, in which reference numerals show the same members as FIG. 2. The arm 14 turns on the shaft 22 and the arm 26 turns on the shaft 33. The 1,000 pulses are applied to the drive control section 53 corresponding to the shaft 22 to rotate the stepping motor so that the arm 14 turns in the counterclockwise direction and at the same time, the 500 pulses of the polarity opposite to the pulses relating to the shaft 22 are applied to the drive control section 53 corresponding to the shaft 33 to turn the arm 26 in the clockwise direction, whereby the gripper 42 is moved from the present point 64 to the target point 65. As a result, the arm 26 is rotated by an angle corresponding to the 500 pulses from a point of the absolute number of pulses 550 to a point of the absolute number of pulses 50. Thus, the drive control section 53 for each axis proceeds to produce a predetermined number of pulses to the driver 54 at each sampling time so that the total number of pulses produced to the drive 54 is finally coincident. In this way, the tip of the hand of the robot may be controlled to move from point 64 to point 65 in an open loop. Also, it is also possible to monitor the motor rotation for any abnormality by the rotation monitor which compares the number of pulses produced from the motor with that produced from the pulse generator.

The stepping motor, which has a high angular reproducibility, is very high in positional reproducibility after driving the motor by a predetermined number of pulses.

According to the embodiment under consideration, the motor rotation may be easily checked for any abnormality by comparing the number of pulses applied to the motor with that produced from the pulse generator, and therefore, should any trouble occur with the stepping motor attributable to the loss of harmony, the robot is stopped according to the amount of error involved. Further, the robot operator is capable of freely programming the continued work after positioning the origin, thereby leading to the advantages of low cost and highly reliable robot control.

Furthermore, in the above-mentioned control circuit, distributed control is possible with direct connection of single-chip low-function microcomputers, with the result that the number of parts is greatly reduced to make a compact control circuit possible.

It will be understood from the foregoing description that according to the present invention, the amount of movement of the arm may be automatically stored by the number of pulses produced from the pulse generator to instruct the robot on the position. Also, the only function of the control section is to subtract the absolute number of pulses for the present point from the absolute number of pulses at the target point and the sole function of the acceleration/deceleration control section is to produce pulses and to compute by comparison the total number of pulses required as predetermined, resulting in the advantage that robot operation is controllable by distributed control of single-chip low-function microcomputers.

We claim:

1. A robot operation control system comprising control section means, a plurality of drivers which are driven by pulse signals from said control section means, and a plurality of stepping motors which are respectively driven on the basis of outputs from an associated one of said drivers to control the point-to-point movement of an arm, said control section means including a sequence control section, an operation control section and a plurality of drive control sections, said seqence control section applying signals representative of a target point to said operation control section in accordance with a prescribed sequence, said operation control section applying signals representative of directions and angles by which axes of the arm are rotated to said drive control sections, and said drive control sections being arranged in accordance with respective axes of the arm to apply the pulse signals representative of speeds dependent on predetermined acceleration/deceleration to said drivers, respectively, so that the arm is moved to the target point.

2. A robot operation control system according to claim 1, wherein said control section means, said plurality of drivers and said stepping motors provide an open loop control.

3. A robot operation control system according to claim 1, further comprising pulse generators supported on the axes of the arm, respectively, and rotation monitors respectively receiving outputs from an associated one of said pulse generators and the pulse signals transmitted from an associated one of said drive control sections to said associated driver, each of said rotation monitors comparing the pulse signals transmitted to said drivers with the outputs from said pulse generators for determining whether the associated stepping motor has driven the arm to the target point.

4. A robot operation control system according to claim 3, wherein each of said rotation monitors provides an output of said sequence control section.

* * * * *